United States Patent [19]

Siegmund

[11] 4,246,016
[45] Jan. 20, 1981

[54] METHOD OF MAKING GRADED REFRACTIVE INDEX FIBERS AND RODS

[75] Inventor: Walter P. Siegmund, Woodstock, Conn.

[73] Assignee: American Optical Corporation, Southbridge, Mass.

[21] Appl. No.: 17,986

[22] Filed: Mar. 7, 1979

[51] Int. Cl.³ ................ C03B 37/025; C03B 37/075; C03C 25/00
[52] U.S. Cl. ................................ 65/3 A; 65/30 E; 65/31
[58] Field of Search ................ 65/3 A, 4 B, 30 E, 31

[56] References Cited

U.S. PATENT DOCUMENTS

| | | | |
|---|---|---|---|
| 2,980,957 | 4/1961 | Hicks, Jr. | 65/2 |
| 3,004,368 | 10/1961 | Hicks, Jr. | 65/31 X |
| 3,037,241 | 6/1962 | Bazinet, Jr. et al. | 65/3 A X |
| 3,624,816 | 11/1971 | Strack et al. | 65/4 B X |
| 3,626,040 | 12/1971 | Nagao et al. | 65/4 B X |
| 3,674,452 | 7/1972 | Strack | 65/31 X |
| 3,791,806 | 2/1974 | Koizumi et al. | 65/34 |
| 3,801,181 | 4/1974 | Kitano et al. | 350/96.31 |
| 3,843,228 | 10/1974 | Yoshiyagawa et al. | 65/30 E X |
| 3,941,474 | 3/1976 | Kitano et al. | 65/30 E X |
| 4,002,452 | 1/1977 | Hopkins | 65/152 |

*Primary Examiner*—Richard V. Fisher
*Attorney, Agent, or Firm*—Jeremiah J. Duggan; Alan H. Spencer

[57] ABSTRACT

Gradient refractive index fibers or rods are formed of leachable glass clad glass core preforms drawn to a desired diametral size, bundled together, fused under high compressing forces and rapidly interdiffused at a temperature above their deformation point. Cooling, annealing and separation of the fibers or rods by leaching provides the end product devices which may be cut into lengths required for the lens power desired and end polished. The refractive index gradient is produced by interdiffusion of $Tl^+$ and $K^+$ ions between core and cladding glasses which are selected to contain substantial proportions of thallium oxide and potassium oxide respectively.

10 Claims, 8 Drawing Figures

METHOD OF MAKING GRADED REFRACTIVE INDEX FIBERS AND RODS

BACKGROUND OF THE INVENTION

1. Field of the Invention

Gradient refractive index optical devices with particular reference to improvements in method of making radially graded refractive index rods, fibers and devices therefrom.

2. Discussion of the Prior Art

A radially graded refractive index fiber or rod has a light focusing power similar to a positive lens or a series of lenses, e.g. a rod as small as 1 mm in diameter can relay a distinct image of an object placed at or near the entrance to the rod.

One method by which gradient index rods or fibers have been prepared includes immersion (steeping) of a rod of glass containing thallium oxide ($Tl_2O$) in a molten bath of potassium nitrate ($KNO_3$) at a temperature higher than the annealing temperature of the glass but lower than its deformation temperature. A typical cycle for this ion exchange process, by which potassium ions replace thallium ions by slow interdiffusion, is 432 hours at 460° C. for a 1 mm diameter rod.

Other unduly tedious and costly methods of treating glass rods or fibers with pastes, powders, liquids and/or gasses for effecting refractive index gradation are exemplified in U.S. Pat. No. 3,843,228 but wherein, as before mentioned, treating temperatures must be maintained below the rod or fiber deformation temperature, i.e. deformation being unacceptable.

With a view to minimizing product costs, simplifying processing techniques and providing for efficient mass production of gradient refractive index rods, fibers and products thereof, a principal object of this invention is to make possible the use of ion diffusion temperatures which are higher than deformation temperatures of articles being treated without permitting deformation of the articles.

In addition to shortening ion diffusion times by using higher than deformation temperatures, another object is to provide for the mass simultaneous ion exchange treatment of large numbers of glass rods or fibers, i.e. bundles thereof adapted to be subsequently readily separated from one another.

Still another object is to accomplish the exchange of ions needed for refractive index gradation in glass rods or fibers with a solid exchange agent having such compatibility with the rod or fiber as to permit simultaneous drawing or shaping of the rod or fiber with the exchange agent prior to effecting ion exchange treatment and wherewith the need to deal with heretofore messy and difficult to handle ion exchange agents and processing techniques is avoided.

Other objects and advantages of the invention will become apparent from the following description.

SUMMARY OF THE INVENTION

According to the present invention, gradient refractive index rods or fibers are formed of glass clad glass core preforms. The cladding glass is formed of a composition containing a substantial proportion of potassium oxide and is otherwise so chemically formulated as to be readily acid leachable. The core glass which ultimately becomes the gradient refractive index rod or fiber contains a substantial proportion of thallium oxide. Compositions of the core and cladding glasses are further so selected as to have expansion coefficients and softening temperatures which permit their simultaneous drawing to reduced sizes desired of the gradient refractive index products prior to effecting the ion exchange treatment required for gradation of refractive index.

A multiplicity of the aforesaid glass clad preforms, either drawn or in initial rod and tube configurations, are bundled together and heated for fusion to one another with high compressing forces holding the bundle core components fixed against distortion. The cladding glasses preferably having somewhat lower softening temperatures than the core glasses fill all voids between the cores and prevent core component deformation at higher than normal deformation temperatures.

The bundle is further heated to a temperature well above its core component deformation temperature for effecting rapid ion exchange between core and cladding components, i.e. interdiffusion of $K^+$ and $Tl^+$ ions. The rate at which diffusion takes place being a function of temperature, the higher the temperature the faster the diffusion rate.

Following $K^+$ and $Tl^+$ interdiffusion, the bundle is cooled, annealed and leached free of the rod cladding glass leaving the rods (cores) free for cutting into lengths required for the lens power desired and polishing of their ends.

Details of the invention will become more readily apparent from the following description when taken in conjunction with the accompanying drawings.

IN THE DRAWINGS

DESCRIPTION OF THE PREFERRED EMBODIMENTS

Figure 1:
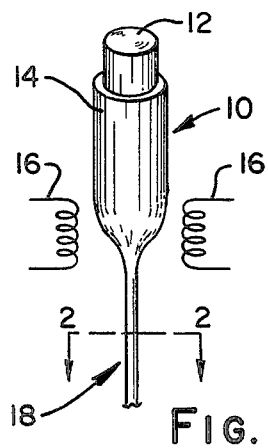
FIG. 1 is a diagrammatic illustration of an initial step in the practice of making graded refractive index articles according to the present invention.
Figure 2:
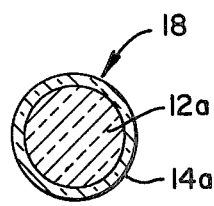
FIG. 2 is an enlarged cross-sectional view taken along line 2—2 of FIG. 1.
Figure 3:
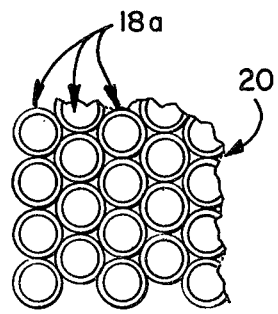
FIG. 3 is a fragmentary illustration of a step of preparing a bundle of a multiplicity of drawn rods or fibers for ion exchange treatment according to the invention.
Figure 4:
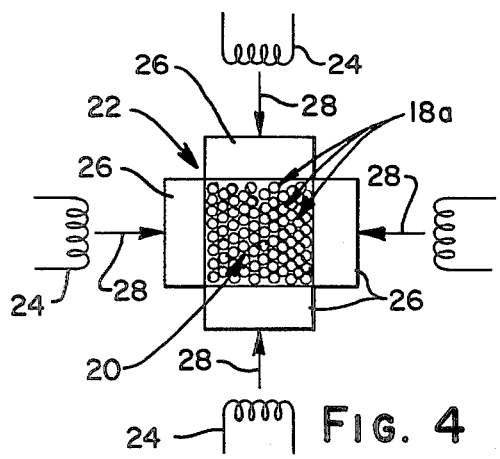
FIG. 4 is a diagrammatic illustration of means and method of performing the ion exchange treatment.

In order to enable ion exchange to take place in an optical rod or fiber article of glass at a temperature above the deformation temperature of the article but without deformation taking place (i.e. for increasing the diffusion rate which is a function of temperature) and to further accomplish the advantage of mass production of graded refractive index rods or fibers in a simple, economical and tidy fashion, the following is comtemplated;

a preform 10 (FIG. 1) comprising a core 12 of a thallium containing glass and cladding 14, i.e. outer sleeve, of potassium containing glass is zonally heated with appropriate heating elements 16 to a temperature suitable for drawing whereupon it is drawn into a rod or fiber 18 having a core diameter of a size desired of a gradient refractive index article to be produced according to the invention.

The resulting long rod or fiber 18, having a thallium containing core 12a and potassium containing cladding 14a is cut into a multiplicity of shorter lengths and/or reproduced a number of times necessary to form elements 18a of bundle 20.

Bundle 20 of elements 18a is formed in or transferred to fusing press 22 adapted to be heated, e.g. with electrical coils 24. In a preferred embodiment of press 22 its sides 26 are adapted to be forced against bundle 20 with equal high pressure to create an isostatic compressing force of from 1000–5000 psi, for example.

Figure 5:
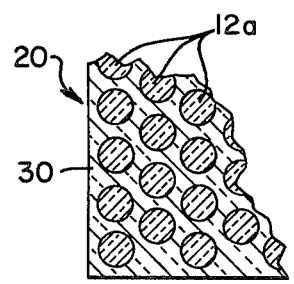
FIG. 5 is an enlarged fragmentary view of a treated bundle of rod or fiber articles.

With bundle 20 heated sufficiently to fuse cladding 14a of fibers 18a together and pressure applied as indicated by arrows 28, the claddings are caused to form matrix 30 (FIG. 5). Matrix 30 surrounds and supports cores 12a against deformation at temperatures higher than their deformation temperature.

Rapid interdiffusion of core Tl+ ions and matrix K+ ions is effected by raising the temperature of bundle 20 above the deformation temperature of the supported cores 12a. Exemplary glass compositions and suitable time-temperature cycles will be given hereinafter.

Those interested in details of apparatus suitable for performing the aforesaid high pressure fusing and ion exchange treatment may refer to U.S. Pat. Nos. 3,626,040 and 4,002,452. The latter illustrates a fusing cycle comprising a "ramp" of increasing temperatures suitable for fusing and effecting ion exchange according to this invention.

After fusing and ion exchange treatment, bundle 20 is cooled to an annealing temperature and annealed, e.g., as illustrated in U.S. Pat. No. 4,002,452.

Figure 6:
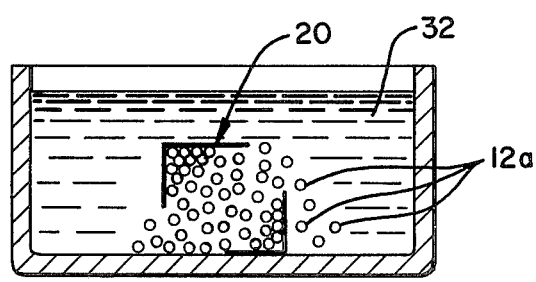
FIG. 6 illustrates a final step of the invention.
Figure 7:
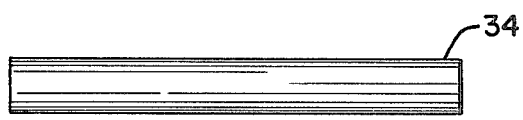
FIGS. 7 and 8 are enlarged side elevational views of image relay devices which may be formed of graded refractive index fibers or rods produced according to the invention.
Figure 8:
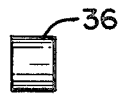

The bundle 20 is then removed from press 22 and immersed in a leaching medium, e.g. acid, 32 (FIG. 6) until all cores 12a become separated from one another and rendered free of matrix 30. Cores 12a are then removed from medium 32 and cleaned with water and/or steam or other suitable cleansing means, e.g. as taught in one or more of U.S. Pat. Nos. 3,004,368; 3,624,816 and 3,674,452 which deal with such matters. This renders the gradient refractive index core pieces individually useful as image-conducting lenses (i.e., with opposite ends optically polished) or available for division into shorter lengths such as lenses 34 and 36 (FIGS. 7 and 8).

A lens 34 or 36 (FIGS. 7 and 8) in the illustrated form of a fiber or rod can in such small diameters as 1 mm relay a distinct image of an object placed at or near its entrance end, e.g. a single long rod can serve as the lens of a needle borescope. Alternatively, in short lengths as in FIG. 8, a lens 36 can serve as an objective for producing an image of an object upon one end of a fiberscope bundle of image-conducting fibers. Also, among various other applications of use, an array of rods such as lens 34 of a length required for producing an upright image in each case can serve as a document copying component.

Referring in more detail to compositions of glasses suitable for core and cladding components 12 and 14 of preform 10 and the drawing of fiber 18 therefrom, the latter may be accomplished by any of the well known techniques of conventional optical fiber drawing. Those interested in these details may refer to U.S. Pat. Nos. 2,980,957; 3,004,368 and 3,037,241.

It should be apparent that cladding 14 may be applied to core 12 of preform 10 in many forms, e.g. as a tube, frit, strip, or slab of glass.

Compositions of glasses suitable for core 12 of preform 10 (FIG. 1) may be found in U.S. Pat. No. 3,941,474 (column 22, Table 4) and/or U.S. Pat. No. 3,801,181 (Example 1, column 7; Example 5, column 8; and Example 6, column 9).

Glass compositions suitable for the soluble (leachable) cladding 14 of preform 20 include the following:

| | EXAMPLES IN WT. % | | | | | |
|---|---|---|---|---|---|---|
| | A | B | C | D | E | F |
| $La_2O_3$ | 8.0 | / | / | / | / | / |
| $B_2O_3$ | 50.0 | / | / | / | / | / |
| CaO | / | / | / | / | 5.5 | 5.5 |
| $SiO_2$ | / | 41.5 | 41.5 | 36.5 | 38.0 | 38.0 |
| $Al_2O_3$ | / | / | / | / | / | 1.0 |
| $Na_2O$ | / | 5.4 | 5.4 | / | / | / |
| PbO | / | / | 10.0 | 49.5 | / | / |
| BaO | 32.0 | 34.5 | 24.5 | / | 38.3 | 38.3 |
| $K_2O$ | 10.0 | 18.6 | 18.6 | 8.6 | 6.7 | 4.7 |
| ZnO | / | / | / | / | 4.5 | 4.5 |
| MgO | / | / | / | 5.4 | 5.0 | 5.0 |
| $Y_2O_3$ | / | / | / | / | / | 1.0 |
| $Sb_2O_3$ | / | / | / | / | 2.0 | 2.0 |

With selected combinations of the aforesaid or similar core 12 and cladding 14 glasses, ion exchange for producing a suitable refractive index gradation in cores 12 may be effected with the application of temperatures of from approximately 540° C. to 640° C. held for a period of from approximately 5 to 30 minutes. A particular time-temperature cycle may be 600° C. held for approximately 10 minutes.

From the foregoing it can be seen that gradient refractive index rods, fibers and "lens" articles formed therefrom may be readily mass produced, i.e. in bundles, with ion exchange treatment effected rapidly at temperatures well above the deformation temperatures.

Various modifications and adaptations of the precise form of the invention described hereinabove may be made to suit particular requirements and, accordingly, it is intended that all such modifications which incorporate the novel concept disclosed are to be construed as coming within the scope of the claims or the range of equivalency to which they are entitled in view of the prior art.

I claim:

1. The method of producing a graded refractive index rod or fiber article comprising the steps of:
    applying to a glass preform containing a substantial proportion of a modifying oxide a leachable glass cladding having an affinity to ions of the modifying oxide;
    heating and drawing the clad preform into an element of a reduced cross-sectional size corresponding to that desired of said article;
    supporting said clad element against the deformation with applied high isostatic pressure;
    reheating said clad element while supported against deformation to a temperature above its deformation temperature and for a period of time sufficient to effect extraction of ions of the modifying oxide into said cladding through the contact surface between said drawn preform and cladding, the rate of extraction of ions being a function of temperature and said isostatic supporting pressure permitting application of higher than deformation temperatures for rapid diffusion of ions of said modifying oxide into said cladding;

cooling and annealing said modified clad element following said extraction of ions and removing said applied pressure; and leaching said cladding away from said element, said element constituting said graded refractive index rod or fiber.

2. The method according to claim 1 wherein said modifying oxide is thallium oxide and said cladding having an affinity to ions of the modifying oxide comprises a glass containing a substantial proportion of potassium oxide.

3. The method according to claim 2 wherein said reheating of said clad element effects interdiffusion of $Tl^+$ and $K^+$ ions through said contact surface.

4. A method according to claim 1 wherein said high isostatic pressure is applied with a mechanical press.

5. The method according to claim 2 wherein said cladding is leached in an acid and said element is cleaned of residue of said acid following said step of leaching.

6. The method of mass producing graded refractive index rod or fiber articles comprising the steps of:

applying to a glass preform containing a substantial proportion of a modifying oxide a leachable glass cladding having an affinity to ions of the modifying oxide;

heating and drawing the clad preform into a long clad element of a reduced cross-sectional size corresponding to that desired of each of said articles;

dividing said long element into a number of shorter lengths;

bundling said shorter lengths of said element together;

heating said bundle sufficiently to fuse said claddings of said lengths of said element together;

applying a high substantially isostatic compressing force to said bundle for support against deformation and further heating said bundle while supported against deformation to a temperature above the deformation temperature of said lengths of said element for a period of time sufficient to effect extraction of ions of the modifying oxide into said claddings of said lengths of said elements, the rate of extraction of ions being a function of temperature and said isostatic supporting pressure permitting application of higher than deformation temperatures for rapid diffusion of ions of said modifying oxide into said cladding;

cooling and annealing said bundle following said extraction of ions and removing said applied pressure; and leaching said claddings away from said lengths of said element, said leached lengths constituting said mass produced graded refractive index rod or fiber articles.

7. The method according to claim 6 wherein said modifying oxide is thallium oxide and said claddings comprise a glass containing a substantial proportion of potassium oxide.

8. The method according to claim 7 wherein said further heating of said bundle effects diffusion of $Tl^+$ ions into claddings of said elements.

9. The method according to claim 8 wherein said high isostatic compressing force is applied with a mechanical press.

10. The method according to claim 6 wherein said claddings are leached from said lengths of said element in an acid and said leached lengths of said element are cleaned of residue of said acid following said step of leaching.

* * * * *